United States Patent
Huang et al.

(10) Patent No.: US 12,088,707 B2
(45) Date of Patent: Sep. 10, 2024

(54) CONTINUOUS-VARIABLE QUANTUM KEY DISTRIBUTION (CV-QKD) METHOD AND SYSTEM

(71) Applicant: SHANGHAI JIAO TONG UNIVERSITY, Shanghai (CN)

(72) Inventors: Peng Huang, Shanghai (CN); Shiyu Wang, Shanghai (CN); Guihua Zeng, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 229 days.

(21) Appl. No.: 17/435,023

(22) PCT Filed: Jan. 23, 2021

(86) PCT No.: PCT/CN2021/073436
§ 371 (c)(1),
(2) Date: Aug. 30, 2021

(87) PCT Pub. No.: WO2021/159947
PCT Pub. Date: Aug. 19, 2021

(65) Prior Publication Data
US 2022/0150060 A1 May 12, 2022

(30) Foreign Application Priority Data
Feb. 14, 2020 (CN) .......................... 202010093011.4

(51) Int. Cl.
*H04L 9/08* (2006.01)
*G06N 10/60* (2022.01)
(Continued)

(52) U.S. Cl.
CPC ........... *H04L 9/0858* (2013.01); *G06N 10/60* (2022.01); *H04B 10/1141* (2013.01);
(Continued)

(58) Field of Classification Search
CPC .. G06N 10/60; H04B 10/114; H04B 10/1141; H04B 10/516; H04B 10/524;
(Continued)

(56) References Cited

U.S. PATENT DOCUMENTS 6,897,434 B1 * 5/2005 Kumar .................. B82Y 10/00
359/341.1
7,284,024 B1 * 10/2007 Trifonov ............... H04L 9/0852
708/3
(Continued)

FOREIGN PATENT DOCUMENTS

CN 107302430 A 10/2017
CN 107566120 A 1/2018
(Continued)

OTHER PUBLICATIONS

Wang, T., et al., High Key Rate Continuous-Variable Quantum Key Distribution with a Real Local Oscillator, Feb. 5, 2018, Optics Express, vol. 26, No. 3, 2794-2806. (Year: 2018).*

*Primary Examiner* — D'Arcy Winston Straub
(74) *Attorney, Agent, or Firm* — Bayramoglu Law Offices LLC

(57) ABSTRACT

A continuous-variable quantum key distribution (CV-QKD) method and system is provided. The CV-QKD method includes: step 1: transmitting a quantum signal and a local oscillation signal synchronously based on time and polarization multiplexing, and performing detection to obtain detection data; and step 2: compensating for the detection data based on a phase compensation algorithm and public data. In this way, a phase can be compensated accurately in channel fading, so as to improve performance of the CV-QKD system.

8 Claims, 1 Drawing Sheet

(51) Int. Cl.
*H04B 10/114* (2013.01)
*H04B 10/524* (2013.01)
*H04B 10/532* (2013.01)
*H04B 10/54* (2013.01)
*H04B 10/556* (2013.01)
*H04B 10/61* (2013.01)
*H04B 10/70* (2013.01)
*H04J 14/06* (2006.01)

(52) U.S. Cl.
CPC ......... *H04B 10/524* (2013.01); *H04B 10/532* (2013.01); *H04B 10/541* (2013.01); *H04B 10/556* (2013.01); *H04B 10/5561* (2013.01); *H04B 10/614* (2013.01); *H04B 10/70* (2013.01); *H04J 14/06* (2013.01); *H04L 9/0852* (2013.01)

(58) Field of Classification Search
CPC .... H04B 10/532; H04B 10/54; H04B 10/541; H04B 10/548; H04B 10/556; H04B 10/5561; H04B 10/60; H04B 10/61; H04B 10/614; H04B 10/70; H04J 14/06; H04L 9/0816; H04L 9/0852; H04L 9/0858

See application file for complete search history.

(56) References Cited

U.S. PATENT DOCUMENTS

| | | | |
|---|---|---|---|
| 7,627,126 | B1 | 12/2009 | Pikalo et al. |
| 2009/0268901 | A1* | 10/2009 | Lodewyck ............ H04L 9/0852 380/279 |
| 2017/0343750 | A1* | 11/2017 | Ashrafi ................ G02B 6/2726 |
| 2019/0199523 | A1* | 6/2019 | Alleaume ............. H04L 9/0852 |
| 2020/0084033 | A1* | 3/2020 | Lamas-Linares ..... H04L 7/0075 |
| 2020/0162248 | A1* | 5/2020 | Qi ........................ H04L 9/0858 |
| 2021/0385079 | A1* | 12/2021 | Curty Alonso ......... H04L 9/085 |

FOREIGN PATENT DOCUMENTS

| | | |
|---|---|---|
| CN | 109039475 A | 12/2018 |
| CN | 109194470 A | 1/2019 |
| CN | 109586911 A | 4/2019 |
| CN | 110113163 A | 8/2019 |
| CN | 110445610 A | 11/2019 |
| CN | 111314071 A | 6/2020 |

* cited by examiner

CONTINUOUS-VARIABLE QUANTUM KEY DISTRIBUTION (CV-QKD) METHOD AND SYSTEM

CROSS REFERENCE TO THE RELATED APPLICATIONS

This application is the national phase entry of International Application No. PCT/CN2021/073436, filed on Jan. 23, 2021, which is based upon and claims priority to Chinese Patent Application No. 202010093011.4, filed on Feb. 14, 2020, the entire contents of which are incorporated herein by reference.

TECHNICAL FIELD

The present invention relates to the technical field of quantum key distribution, and specifically, to a continuous-variable quantum key distribution (CV-QKD) method and system. In particular, the present invention relates to a phase compensation method for free-space transmission in the CV-QKD system.

BACKGROUND

With the coming of the information age, the continuous development of communication technologies provides a fast channel for information transmission, while people pay more and more attention to security of information in a transmission process. With the development of quantum computers, computational security of classical cryptography will face great challenges. The quantum key distribution solution based on the basic principle of quantum mechanics theoretically has unconditional security, which can guarantee the security of communication physically. As a kind of quantum key distribution solution, the CV-QKD is based on the uncertainty principle of coherent-state orthogonal components. By means of coherent detection, the CV-QKD is well compatible with existing optical fiber communications systems, and has the internal characteristic of protecting against background noise in free-space transmission, thereby becoming a very competitive commercial key distribution implementation solution. However, in a free-space CV-QKD system, due to random fading of a channel to a signal, it is difficult to perform phase compensation.

In order to solve this problem, a phase drift is estimated by calculating a cross-correlation and finding a maximum value in the free-space CV-QKD system. Phase compensation is performed at a transmitting end based on the estimated phase drift. A quantum signal and a local oscillation signal are transmitted through time and polarization multiplexing, and are detected at a receiving end through homodyne detection. This solution achieves accurate phase compensation for a fading channel, and thus can be widely applied to the free-space CV-QKD system.

The patent document CN109194470A (application No.: 201811045247.X) discloses an efficient CV-QKD method. The method includes the following: a transmitting end sends N weak light pulses and one strong light pulse in one cycle; the weak light pulses and the strong light pulse are separated by a first beam splitter after undergoing amplitude modulation; the weak light pulses are input into a second beam splitter after undergoing amplitude modulation and phase modulation, and then pass through first and second polarization beam splitters, and meanwhile the strong light pulse is input into the second polarization beam splitter after passing through an unmodulated equal-distance light path, and the second polarization beam splitter outputs a group of light pulses; the light pulses are sent to a receiving end; and the receiving end receives the light pulses and performs heterodyne detection in combination with the local light to obtain a continuous-variable quantum key sent by the transmitting end.

SUMMARY

To overcome shortcomings in the prior art, the present invention is intended to provide a continuous-variable quantum key distribution (CV-QKD) method and system.

A CV-QKD method provided in the present invention includes:
step 1: transmitting a quantum signal and a local oscillation signal synchronously based on time and polarization multiplexing, and performing detection to obtain detection data; and
step 2: compensating for the detection data based on a phase compensation algorithm and public data.

Preferably, step 1 includes:
step 1.1: chopping, by an intensity modulator, continuous laser light emitted by a laser, and converting the continuous laser light into a light pulse sequence;
step 1.2: modulating a part of the light pulse sequence, loading to-be-transmitted information to the quantum signal, and performing delay;
step 1.3: combining a light pulse sequence of the quantum signal loaded with the to-be-transmitted information and a light pulse sequence of the local oscillation signal through polarization multiplexing, and transmitting a combined light pulse sequence to a receiving end through a free-space channel;
step 1.4: performing, by a polarization beam splitter, beam splitting at the receiving end, aligning the light pulse sequence of the quantum signal loaded with the to-be-transmitted information and the light pulse sequence of the local oscillation signal in time domain through delay, and performing homodyne detection; and
step 1.5: collecting, by a data collection device, an electrical signal output by a detector, and performing digital signal processing to obtain the detection data.

Preferably, step 2 includes:
step 2.1: publishing the public data by two communication parties, and performing, by a transmitting end, phase shifting on the public data to generate contrasted data;
step 2.2: calculating a cross-correlation between the contrasted data and the detection data, and finding a maximum value, where a phase shifting angle of the maximum value is a phase drift estimating value;
step 2.3: performing data compensation on the detection data based on the phase drift estimating value; and
step 2.4: performing negotiated decoding on compensated detection data, and performing privacy amplification to obtain a final key.

Preferably, a length of the public data affects compensation accuracy.

Preferably, a range of the phase shifting is 0 to 360 degrees; and
an interval between a plurality of phase shifting is set as needed, and affects compensation accuracy.

A CV-QKD system provided in the present invention includes:
a module M1 configured for transmitting a quantum signal and a local oscillation signal synchronously based on time and polarization multiplexing, and performing detection to obtain detection data; and a module M2 configured for compensating for the detection data based on a phase compensation algorithm and public data.

Preferably, the module M1 includes:

a module M1.1, configured to: chop, by an intensity modulator, continuous laser light emitted by a laser, and convert the continuous laser light into a light pulse sequence;

a module M1.2, configured to: modulate a part of the light pulse sequence, load to-be-transmitted information to the quantum signal, and perform delay;

a module M1.3, configured to: combine a light pulse sequence of the quantum signal loaded with the to-be-transmitted information and a light pulse sequence of the local oscillation signal through polarization multiplexing, and transmit a combined light pulse sequence to a receiving end through a free-space channel;

a module M1.4, configured to: perform, by a polarization beam splitter, beam splitting at the receiving end, align the light pulse sequence of the quantum signal loaded with the to-be-transmitted information and the light pulse sequence of the local oscillation signal in time domain through delay, and perform homodyne detection; and a module M1.5, configured to: collect, by a data collection device, an electrical signal output by a detector, and perform digital signal processing to obtain the detection data.

Preferably, the module M2 includes:

a module M2.1, configured to: publish the public data by two communication parties, and perform, by a transmitting end, phase shifting on the public data to generate contrasted data;

a module M2.2, configured to: calculate a cross-correlation between the contrasted data and the detection data, and find a maximum value, wherein a phase shifting angle of the maximum value is a phase drift estimating value;

a module M2.3, configured to: perform data compensation on the detection data based on the phase drift estimating value; and a module M2.4, configured to: perform negotiated decoding on compensated detection data, and perform privacy amplification to obtain a final key.

Preferably, a length of the public data affects compensation accuracy.

Preferably, a range of the phase shifting is 0 to 360 degrees; and an interval between a plurality of phase shifting is set as needed, and affects compensation accuracy.

Compared with the prior art, the present invention has the following beneficial effects:

1. The present invention can compensate for a phase accurately in channel fading, and improve performance of the CV-QKD system.
2. The present invention sets the phase shifting range and interval, improving the compensation accuracy.

BRIEF DESCRIPTION OF THE DRAWINGS

Other features, objectives, and advantages of the present invention will become more apparent from a reading of the detailed description of non-limiting embodiments with reference to the following accompanying drawings.

DETAILED DESCRIPTION OF THE EMBODIMENTS

The present invention is described in detail below with reference to specific embodiments. The following embodiments will help those skilled in the art to further understand the present invention, but do not limit the present invention in any way. It should be noted that several variations and improvements can also be made by a person of ordinary skill in the art without departing from the conception of the present invention. These are all within the scope of protection of the present invention.

According to a phase compensation solution for free-space transmission in a CV-QKD system provided in the present invention, the continuous development of communication technologies in the information age provides a fast channel for information transmission, and more and more attention is paid to security of information in a transmission process. As a kind of quantum key distribution solution, CV-QKD distributes key information by encoding the key information on a regular light field component, and provides security assurance based on the uncertainty principle of coherent-state orthogonal components. With coherent detection, CV-QKD is well compatible with existing optical fiber communications systems, and has a function of protecting against internal background noise in free-space transmission, thereby becoming a very competitive commercial key distribution implementation solution. However, in a transmission process on a free-space channel, due to impact of channel fading, it is difficult to perform phase compensation on a transmitted signal. To resolve this problem, some data is published in a free-space CV-QKD system to calculate a cross-correlation and find a maximum value, to estimate a phase drift. Phase compensation is performed at a transmitting end for the estimated phase drift to allow subsequent processing and distribute a quantum key.

To achieve the above objective, the technical solution adopted in the present invention is as follows:

At first, a quantum signal and a local oscillation pulse sequence are transmitted.

Figure 1:
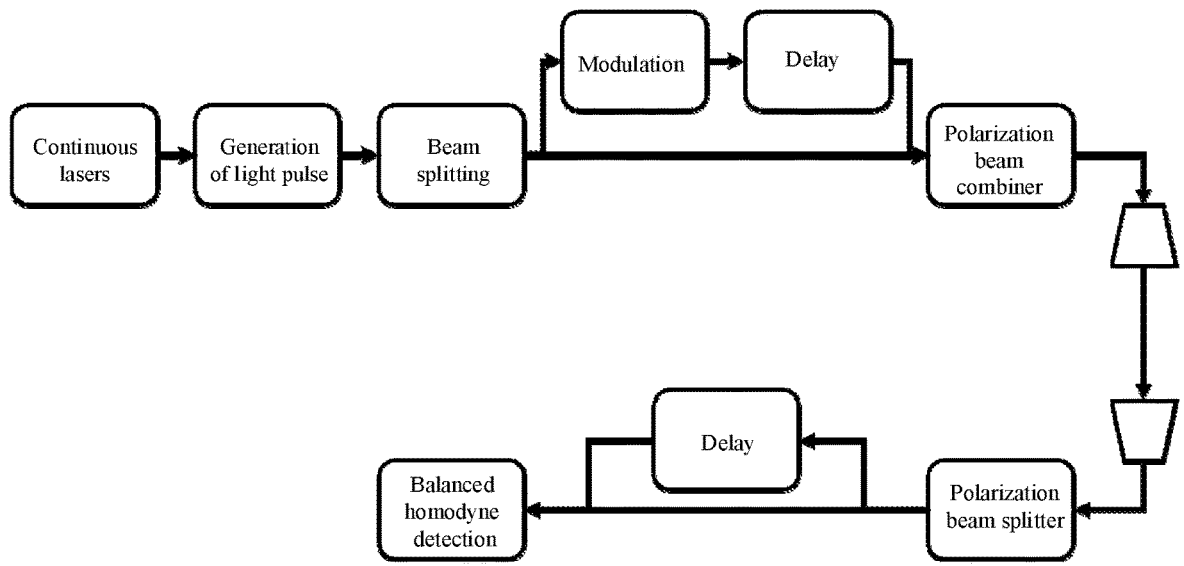
FIG. 1 is a structural diagram of signal transmission.

A transmission structure of the quantum signal is shown in FIG. 1. At a transmitting end, laser light emitted by continuous lasers is first input into an intensity modulator for chopping, to generate a light pulse sequence. Then, the pulse sequence is split into beams, and one of the beams is modulated and delayed to generate the quantum signal. A local oscillation signal and the quantum signal are transmitted simultaneously through polarization multiplexing, and sent to a receiving end through a free-space channel.

After being received at the receiving end, the local oscillation signal and the quantum signal are separated by a polarization beam splitter and are delayed, and a local oscillation signal pulse and a quantum signal pulse are aligned. Then, homodyne detection is performed for signal detection, and a high-speed collection device is used to collect an electrical signal for subsequent data processing.

Figure 2:
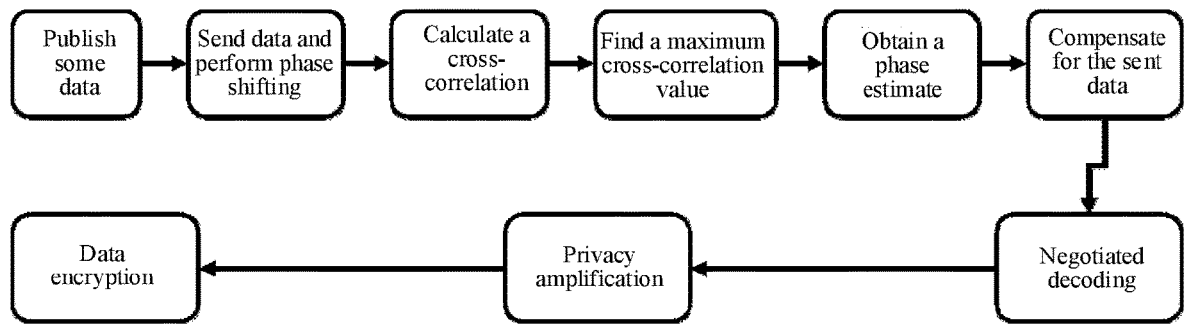
FIG. 2 is a flowchart of a phase compensation solution.

A phase compensation solution is shown in FIG. 2. After the quantum signal is detected, two communication parties publish some data for phase compensation. Phase shifting is performed on data of the transmitting end for a plurality of times within 0 to 360 degrees to generate new data. A cross-correlation operation is performed on the new data and data of the receiving end, and a maximum cross-correlation value is found. A phase shifting angle corresponding to the maximum cross-correlation value is a phase drift estimating value. Phase shifting is performed on the data of the transmitting data based on the estimate to compensate for a phase drift.

Negotiated data decoding and privacy amplification are performed on a compensated quantum signal to generate a final key. The key can be configured for data encryption to guarantee security of information transmission.

Those skilled in the art are aware that in addition to being realized by pure computer-readable program code, the system, the apparatus, and each module thereof provided in the present invention can realize a same program in a form of a logic gate, a switch, an application-specific integrated circuit, a programmable logic controller, or an embedded microcontroller by performing logic programming on the method steps. Therefore, the system, the apparatus, and each module thereof provided in the present invention can be regarded as a kind of hardware component. The module included therein for realizing each program can also be regarded as a structure in the hardware component; and the module for realizing each function can also be regarded as a software program for implementing the method or a structure in the hardware component.

The specific embodiments of the present invention are described above. It is to be appreciated that the present invention is not limited to the specific implementations described above, and various variations or modifications may be made by those skilled in the art within the scope of the claims, without affecting the substantive content of the present invention. The embodiments in this application and the characteristics in the embodiments can be combined mutually in the case of no conflict.

What is claimed is:

1. A continuous-variable quantum key distribution (CV-QKD) method, comprising:
    transmitting a quantum signal and a local oscillation signal synchronously through a free-space channel based on time delay and polarization multiplexing, and performing detection to obtain detection data, comprising:
        chopping, by an intensity modulator, continuous laser light emitted by a laser, and converting the continuous laser light into a light pulse sequence;
        modulating a part of the light pulse sequence, loading to-be-transmitted information to the quantum signal, and performing time delay;
        combining a light pulse sequence of the quantum signal loaded with the to-be-transmitted information and a light pulse sequence of the local oscillation signal through polarization multiplexing to obtain a combined light pulse sequence, and transmitting the combined light pulse sequence to a receiving end through the free-space channel;
        performing, by a polarization beam splitter, beam splitting at the receiving end, aligning the light pulse sequence of the quantum signal loaded with the to-be-transmitted information and the light pulse sequence of the local oscillation signal in time domain through delay, and performing homodyne detection; and
        collecting, by a data collection device, an electrical signal output by a detector, and performing digital signal processing to obtain the detection data; and
    implementing a phase compensation for the detection data based on a phase compensation algorithm and public data.

2. The CV-QKD method according to claim 1, wherein implementing a phase compensation for the detection data based on a phase compensation algorithm and public data comprises:
    publishing the public data by two communication parties, and performing, by a transmitting end, phase shifting, by applying a plurality of predetermined phase shifting angles, on the public data to generate contrasted data;
    calculating a cross-correlation between the contrasted data and the detection data, and finding a maximum value, wherein a phase shifting angle of the plurality of phase shifting angles that produces the maximum value is a phase drift estimating value;
    performing data compensation on the detection data based on the phase drift estimating value to obtain compensated detection data; and
    performing negotiated decoding on the compensated detection data, and performing privacy amplification to obtain a final key.

3. The CV-QKD method according to claim 2, wherein a length of the public data affects compensation accuracy.

4. The CV-QKD method according to claim 2, wherein a range of the phase shifting is 0 to 360 degrees; and
    an interval between a plurality of phase shifting is set, and affects compensation accuracy.

5. A continuous-variable quantum key distribution (CV-QKD) system, comprising:
    a first module comprising circuitry configured to transmit a quantum signal and a local oscillation signal synchronously through a free-space channel based on time delay and polarization multiplexing, and perform detection to obtain detection data, wherein the first module comprises:
        a first submodule configured to chop, by an intensity modulator, continuous laser light emitted by a laser, and convert the continuous laser light into a light pulse sequence;
        a second submodule configured to modulate a part of the light pulse sequence, load to-be-transmitted information to the quantum signal, and perform time delay;
        a third submodule configured to combine a light pulse sequence of the quantum signal loaded with the to-be-transmitted information and a light pulse sequence of the local oscillation signal through polarization multiplexing to obtain a combined light pulse sequence, and transmit the combined light pulse sequence to a receiving end through the free-space channel;
        a fourth submodule configured to perform, by a polarization beam splitter, beam splitting at the receiving end, align the light pulse sequence of the quantum signal loaded with the to-be-transmitted information and the light pulse sequence of the local oscillation signal in time domain through delay, and perform homodyne detection; and
        a fifth submodule configured to collect, by a data collection device, an electrical signal output by a detector, and perform digital signal processing to obtain the detection data; and
    a second module comprising circuitry configured to:
        implement a phase compensation for the detection data based on a phase compensation algorithm and public data.

6. The CV-QKD system according to claim 5, wherein the second module comprises:
- a primary submodule configured to: publish the public data by two communication parties, and perform, by a transmitting end, phase shifting on the public data to generate contrasted data;
- a secondary submodule configured to: calculate a cross-correlation between the contrasted data and the detection data, and find a maximum value, wherein a phase shifting angle of the maximum value is a phase drift estimating value;
- a tertiary submodule configured to: perform data compensation on the detection data based on the phase drift estimating value to obtain compensated detection data; and
- a quatenary submodule configured to: perform negotiated decoding on the compensated detection data, and perform privacy amplification to obtain a final key.

7. The CV-QKD system according to claim 6, wherein a length of the public data affects compensation accuracy.

8. The CV-QKD system according to claim 6, wherein a range of the phase shifting is 0 to 360 degrees; and
- an interval between a plurality of phase shifting is set, and affects compensation accuracy.

* * * * *